(12) United States Patent  
Bekiroglu et al.

(10) Patent No.: US 12,514,394 B2  
(45) Date of Patent: Jan. 6, 2026

(54) ZERO RETENTION COFFEE BEAN HOPPER

(71) Applicant: SharkNinja Operating LLC, Needham, MA (US)

(72) Inventors: Korkut Bekiroglu, Newtonville, MA (US); Manan Patel, Boston, MA (US); Steven P. Carter, London (GB); Scott John Shaw, Waltham, MA (US); Eli Piscitelli, Walpole, MA (US); Ethan T. Brown, Cambridge, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 19/070,460

(22) Filed: Mar. 4, 2025

(65) Prior Publication Data

US 2025/0275644 A1    Sep. 4, 2025

Related U.S. Application Data

(60) Provisional application No. 63/560,827, filed on Mar. 4, 2024.

(51) Int. Cl.
*A47J 31/42* (2006.01)
*A47J 42/44* (2006.01)
*A47J 42/50* (2006.01)

(52) U.S. Cl.
CPC .............. *A47J 31/42* (2013.01); *A47J 42/44* (2013.01); *A47J 42/50* (2013.01)

(58) Field of Classification Search
CPC .............. A47J 31/42; A47J 42/44; A47J 42/50
See application file for complete search history.

(56) References Cited

U.S. PATENT DOCUMENTS

| 11,992,158 B2 | 5/2024 | Oilmaghani et al. |
| 2012/0024160 A1* | 2/2012 | Van Os ............... A47J 31/42 426/115 |
| 2018/0055288 A1 | 3/2018 | Rose et al. |
| 2022/0104660 A1 | 4/2022 | Almagor |
| 2023/0017236 A1* | 1/2023 | Oilmaghani ........... A47J 42/50 |

FOREIGN PATENT DOCUMENTS

| CN | 106993948 B | 11/2020 |
| WO | 2023288023 A1 | 1/2023 |

OTHER PUBLICATIONS

U.S. Appl. No. 18/651,926 entitled "Suggesting Coffee Bean Grind Size for Beverage Machines" filed May 1, 2024, 194 pages.

(Continued)

*Primary Examiner* — Mohammed S. Alawadi
(74) *Attorney, Agent, or Firm* — Mintz, Levin, Cohn, Ferris, Glovsky and Popeo, P.C. US

(57) ABSTRACT

In one aspect, a method of using an automated beverage machine can include causing coffee beans to be dispensed from a hopper configured to contain the coffee beans and into a grinder configured to grind the coffee beans. The method can further include receiving, from a weight sensor configured to measure a total weight of the hopper and the coffee beans, data characterizing a weight of the hopper, and determining, based on the received data, an amount of coffee beans dispensed into the grinder.

20 Claims, 7 Drawing Sheets

(56) References Cited

OTHER PUBLICATIONS

U.S. Appl. No. 18/651,936 entitled "Milk Frothing" filed May 1, 2024, 167 pages.
U.S. Appl. No. 18/651,970 entitled "Preventing Coffee Bean Grinder Jamming" filed May 1, 2024, 190 pages.
U.S. Appl. No. 18/652,063 entitled "Preparation of Beverage Machines for Cold Beverage Brewing" filed May 1, 2024, 155 pages.
U.S. Appl. No. 18/652,309 entitled "Beverage Machine Filters And Portafilters" filed May 1, 2024, 204 pages.
U.S. Appl. No. 18/652,415 entitled "Beverage Machine Portafilters" filed May 1, 2024, 210 pages.
U.S. Appl. No. 18/652,514 entitled "Coffee Tamping" filed May 1, 2024, 212 pages.
U.S. Appl. No. 18/652,049 entitled "Descaling Beverage Machines" filed May 1, 2024, 188 pages.
U.S. Appl. No. 18/654,947 entitled "Queueing Beverage Machine Preparations" filed May 3, 2024, 180 pages.
Invitation to Pay Additional Fees received for PCT Patent Application No. PCT/US2025/018387, mailed on Jun. 3, 2025, 11 pages.

\* cited by examiner

ZERO RETENTION COFFEE BEAN HOPPER

CROSS-REFERENCE TO RELATED APPLICATIONS

This application claims the benefit of U.S. Provisional Patent Application No. 63/560,827, entitled "Zero Retention Coffee Bean Hopper," filed Mar. 4, 2024, the disclosure of which is hereby incorporated herein by reference in its entirety.

FIELD

The present disclosure relates generally to automated beverage machines.

BACKGROUND

The widespread consumption of coffee beverages has fostered the development of a variety of machines for brewing coffee and espresso drinks. One class of coffee machine, the so-called "fully automatic" or "super-automatic" coffee machine, automates the entire coffee preparation process from the grinding of coffee beans to the dispensing of a prepared beverage. These machines frequently offer a diverse array of drinks including, e.g., espresso shots, lattes, and mochas, allowing the machines to satisfy a wide range of drink preferences. Fully automatic coffee machines are also, in general, easy to maintain, since users only need to perform simple upkeep tasks such as refilling a coffee bean hopper on occasion. The versatility and convenience of fully automatic coffee machines have increased their popularity in settings such as corporate offices that are frequented by high numbers of coffee drinkers.

SUMMARY

In general, automated beverage machines and methods of using automated beverage machines are provided.

In one aspect, a method is provided including causing coffee beans to be dispensed from a hopper configured to contain the coffee beans and into a grinder configured to grind the coffee beans, receiving, from a weight sensor configured to measure a total weight of the hopper and the coffee beans, data characterizing a weight of the hopper, and determining, based on the received data, an amount of coffee beans dispensed into the grinder.

In some embodiments, the method can further include determining that the amount of coffee beans dispensed into the grinder corresponds to a predetermined amount of coffee beans associated with an ordered beverage. In response to determining that the amount of coffee beans dispensed into the grinder corresponds to the predetermined amount of coffee beans, coffee beans can be caused to stop being dispensed from the hopper.

In some embodiments, the method can further include starting the grinder to cause the coffee beans dispensed into the grinder to be ground. In response to determining that the amount of coffee beans dispensed into the grinder corresponds to the predetermined amount of coffee beans, the method can include determining that all but a threshold amount of coffee beans and coffee grounds have been cleared from the grinder. The threshold amount of coffee beans and coffee grounds can be 0.5 grams or another amount of coffee beans and coffee grounds. In response to determining that all but the threshold amount of coffee beans and coffee grounds have been cleared from the grinder, the grinder can be stopped.

In some embodiments, the method can further include determining, based upon the information regarding the weight of the hopper, an average rate of change of the amount of coffee beans dispensed into the grinder. In some embodiments, the amount of beans dispensed into the grinder is determined at a first time, and the method further includes determining, based upon the amount of coffee beans dispensed into the grinder and the average rate of change of the amount of coffee beans dispensed into the grinder, a predicted amount of coffee beans that will be dispensed into the grinder by a second time after the first time. Additionally, the method can include determining that the predicted amount of coffee beans that will be dispensed into the grinder by the second time matches a predetermined amount of coffee beans associated with an ordered beverage. The dispensing operation can be stopped in response to determining that the predicted amount of coffee beans that will be dispensed into the grinder by the second time matches a predetermined amount of coffee beans associated with an ordered beverage.

In another aspect, a method is provided including causing coffee beans to be dispensed by a dispenser from a hopper configured to contain the coffee beans and into a grinder configured to grind the coffee beans, receiving, from a weight sensor configured to measure a total weight of the hopper and the coffee beans, data characterizing a weight of the hopper, and detecting, based on the data characterizing the weight of the hopper, a deviation, from a preset value, of an operating parameter associated with the hopper, the dispenser, or the weight sensor. In some embodiments, the method can further include notifying a user of the deviation, for example by displaying a notification of the deviation on a user interface.

In some embodiments, in response to detecting the deviation, from the preset value, of the operating parameter associated with the hopper, the dispenser, or the weight sensor, the method can include causing the coffee beans to stop being dispensed from the hopper and into the grinder. Once the operating parameter associated with the hopper, the dispenser, or the weight sensor has been no longer deviates from the preset value, dispensing of the coffee beans from the hopper and into the grinder can be resumed.

In some embodiments, detecting the deviation, from the preset value, of the operating parameter associated with the hopper, the dispenser, or the weight sensor can include determining, based on the data characterizing the weight of the hopper, an average rate of change of an amount of coffee beans dispensed into the grinder. Detecting the deviation, from the preset value, of the operating parameter associated with the hopper, the dispenser, or the weight sensor can further include determining that the average rate of change of the amount of coffee beans dispensed into the grinder is less than a predefined lower limit or greater than a predefined upper limit. The predefined upper limit can 5 grams of coffee beans per second or another amount and the predefined lower limit can be −3.5 grams of coffee beans per second or another amount. In some embodiments, the method can further include determining an amount of time that the average rate of change of the amount of coffee bans dispensed into the grinder has been less than the predefined lower limit or greater than the predefined upper limit.

In some embodiments, if the detected deviation is associated with the dispenser, the method can further include determining that a duty cycle of the dispenser is less than a predefined duty cycle limit. The predefined duty cycle limit can be 70% or another amount. If the duty cycle of the dispenser is less than the predefined duty cycle limit, the method can include increasing a duty cycle of the dispenser in response to determining that the duty cycle of the dispenser is less than the predefined duty cycle limit.

The details of one or more variations of the subject matter described herein are set forth in the accompanying drawings and the description below. Other features and advantages of the subject matter described herein will be apparent from the description, the drawings, and the claims.

BRIEF DESCRIPTION OF THE FIGURES

The disclosure should be read in conjunction with the following figures.

DETAILED DESCRIPTION

Figure 1:
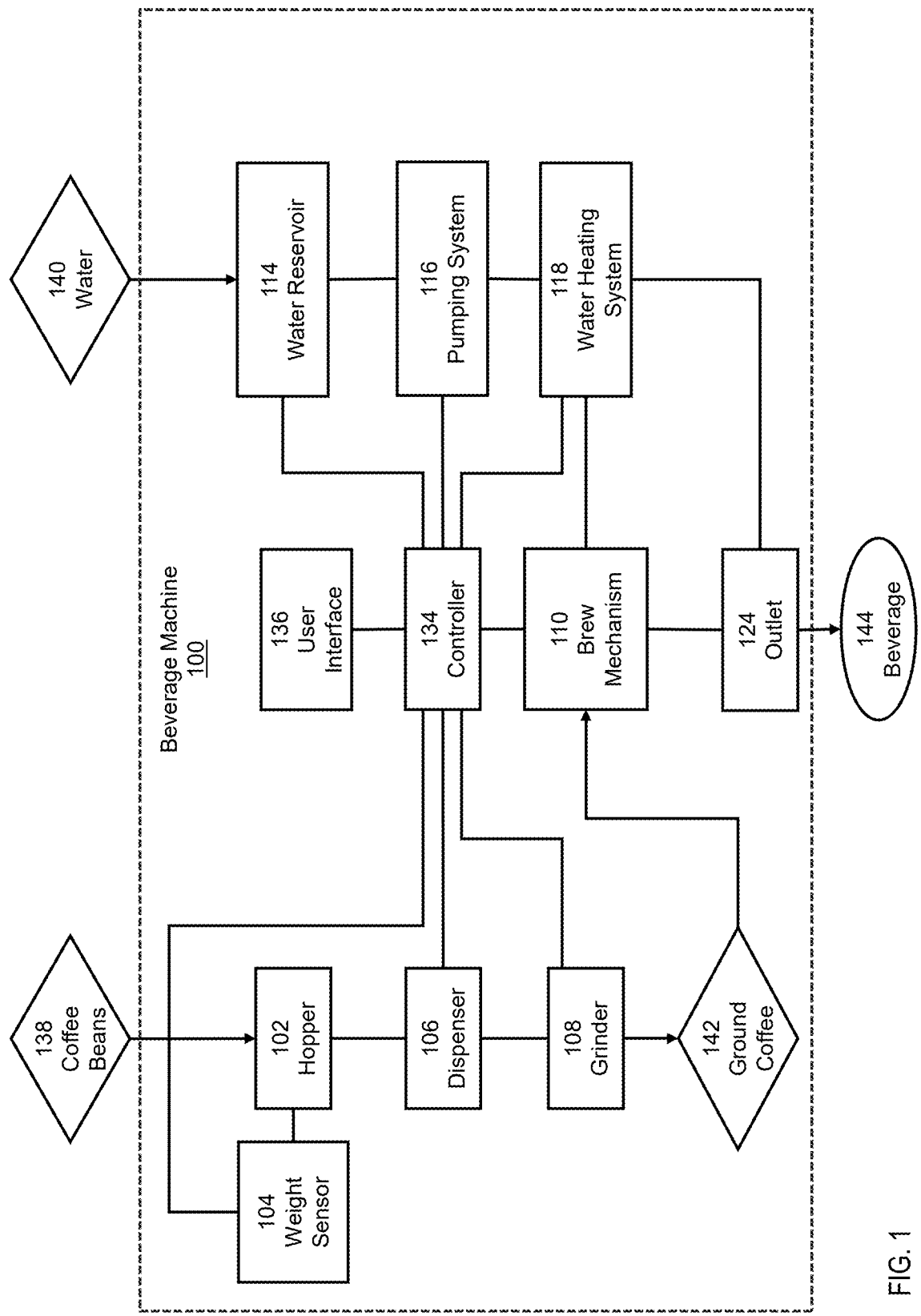
FIG. 1 is a block diagram of one implementation of a beverage machine.

Certain embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Demand for automated beverage machines is high due to the ability of said machines to produce a wide variety of drinks with minimal user labor. However, the processes for dosing raw beverage ingredients (e.g., coffee beans) that are executed by many existing automated beverage machines are highly inefficient. These inefficiencies can lead to significant amounts of ingredient waste and can burden users with demanding maintenance tasks. Existing automatic coffee machines, for example, frequently dose coffee beans by initiating and stopping dispensing of beans in a time-based manner or based upon a weight of coffee grounds produced by a coffee grinder that grinds the dispensed beans. In such machines, operation of the grinder (or other component) may be stopped while beans are still being dispensed, causing excess beans to become trapped in the grinder (and/or the other component) of the beverage machine and potentially causing a jam. Even if a jam does not result, users generally must clean the grinder and/or other element(s) of the beverage machine in which excess beans are trapped to, for example, prevent dosing errors in subsequent brew cycles or, for another example, prevent mixing of different types of coffee beans. Cleaning such components is often cumbersome and difficult, both for trained baristas and especially for untrained home or office users.

Provided herein according to certain implementations are innovative processes for dispensing and processing raw ingredients that enable automated beverage machines to brew high quality drinks while generating little-to-no raw ingredient waste. The disclosed processes can allow for precise control over raw ingredient dosing that eliminates both the need for purging machine components after dosing and the possibility of unwanted mixing of different types of raw ingredients.

In an exemplary implementation a beverage machine (also referred to herein as a "machine") can include a bean hopper (also referred to herein as a "hopper" or a "coffee bean hopper") and a grinder disposed downstream of the hopper and arranged to receive beans (also referred to herein as "coffee beans") from the hopper. The machine can include a weight sensor, such as a scale or a device including a load cell, configured to measure a weight of the bean hopper, as well as an electro-mechanically controllable dispenser arranged to dispense beans from the hopper into the grinder. The machine can be configured to continue grinding beans using the grinder until a predetermined measured weight of beans (determined by monitoring a change in the weight of the bean hopper using the weight sensor) have passed out of the grinder, such that there are substantially no beans or grounds retained in the grinder, e.g., between grinding elements, such as burrs, of the grinder, and substantially all of the beans or grounds (e.g., all but an amount of beans or grounds less than or equal to 0.5 grams) have passed out of the grinder. In some embodiments, the grounds (also referred to herein as "coffee grounds," "coffee grinds," or "grinds") pass out of the grinder and into a brew mechanism of the beverage machine, e.g., into a brew chamber or brew basket of the beverage machine, where water is introduced to the grinds to form the beverage.

The beverage machine may allow for accurate control over coffee dosing by monitoring a weight of beans leaving the hopper. By providing a machine capable of accurately controlling dosing by weight, the machine is able to completely grind the beans that are dispensed from the hopper into the grinder such that substantially no grounds are retained in the grinder, which may reduce waste of coffee beans, enable swappable bean hoppers (e.g., enabling different bean hoppers to be selectively mounted to the frame such as to allow for hoppers of different volumes, to allow a worn or broken hopper to be replaced, to allow for easy swapping of hoppers containing different types of beans, etc.), eliminate the need for purging the grinder after brewing, and/or eliminating the possibility of mixing different coffee bean types in a dose. Given that substantially no grounds are retained in the grinder after a dose, the machine may also enable automatic adjustment of a gap between the grinding elements of the grinder and thus automatic adjustment of the size of the ground coffee particles (e.g., the grind size) during periods of time when the grinder is not operating.

In some implementations, a beverage machine is configured to brew one or more types of espresso beverages (e.g., single espresso shots, double espresso shots, ristrettos, lungos, Americanos, cold-press beverages, etc.). Additionally, or alternatively, a beverage machine can be configured to brew one or more types of non-espresso coffee beverages such as drip coffee drinks. In some implementations, a beverage machine configured to brew one or more types of espresso beverages and/or one or more types of non-espresso coffee beverages is configured to dispense a drinkable liquid, e.g., water that has been heated for, e.g., brewing tea, and/or (hot or cold) milk for producing drinks such as lattes.

The systems, devices, and methods described herein are not limited to coffee machines. A coffee machine is one example of a device to which the systems, devices, and methods described herein apply. The systems, devices, and methods described herein also apply to other types of devices, such as a standalone coffee grinder and a non-coffee beverage brewing device. For example, the systems, devices, and methods described herein can apply to a beverage brewing machine that is configured to produce chocolate beverages (e.g., hot chocolate), or a beverage brewing machine that is configured to produce tea beverages.

Various implementations of beverage machines are further described in, for example, U.S. patent application Ser. No. 18/651,926 entitled "Suggesting Coffee Bean Grind Size For Beverage Machines" filed on May 1, 2024, U.S. patent application Ser. No. 18/651,936 entitled "Milk Frothing" filed on May 1, 2024, U.S. patent application Ser. No. 18/651,970 entitled "Preventing Coffee Bean Grinder Jamming" filed on May 1, 2024, U.S. patent application Ser. No. 18/652,309 entitled "Beverage Machine Filters And Portafilters" filed on May 1, 2024, U.S. patent application Ser. No. 18/652,415 entitled "Beverage Machine Portafilters" filed on May 1, 2024, U.S. patent application Ser. No. 18/652,514 entitled "Coffee Tamping" filed on May 1, 2024, U.S. patent application Ser. No. 18/652,049 entitled "Descaling Beverage Machines" filed on May 1, 2024, U.S. patent application Ser. No. 18/652,063 entitled "Preparation Of Beverage Machines For Cold Beverage Brewing" filed on May 1, 2024, and U.S. patent application Ser. No. 18/654,947 entitled "Queueing Beverage Machine Preparations" filed on May 3, 2024, which are hereby incorporated by reference in their entireties.

FIG. 1 shows one exemplary implementation of a beverage machine 100. The beverage machine 100 is configured to brew and dispense a beverage 144. In this implementation, the beverage 144 can be a coffee-based drink, such as an espresso drink or a brewed coffee drink, or a non-coffee-based drink, such as hot chocolate. The beverage 144 can be hot or cold.

As shown in FIG. 1, the beverage machine 100 can include a hopper 102, a weight sensor 104, a dispenser 106, a grinder 108, a water reservoir 114, a water pumping system (also referred to herein as a "pumping system") 116, a water heating system 118, a brew mechanism 110, a beverage outlet (also referred to herein as an "outlet") 124, a controller 134, and a user interface 136. The components of the beverage machine 100 can be contained in or otherwise connected to a housing (not shown in FIG. 1) and can be supported by a base that is configured to be positioned on a support surface (e.g., a countertop, a table, etc.). It will be apparent to those skilled in the art that, in other implementations, a beverage machine can include other components not shown in FIG. 1 (e.g., portafilters, valves, flowmeters, whisks, steam wands, tampers, a milk supply system, a drip tray, a debris container, etc.).

The controller 134 can be configured to monitor and/or control operations of one or more components of the beverage machine 100 in order to execute one or more steps in a process for brewing the beverage 144 automatically (e.g., without requiring direct intervention or action by the user other than triggering a start of the brew process such as via an input to the user interface 136 as discussed further below). The controller 134 can be any suitable device or combination of devices that includes a data processor (e.g., a central processing unit (CPU), etc.) and a memory (e.g., random access memory (RAM), etc.). For example, the controller 134 can be a microcontroller. The memory is configured to store instructions that, when executed by the controller 134, cause the controller 134 to perform various operations, as described herein. One implementation of the controller 134 is described below with respect to FIG. 7.

The beverage machine 100 can be configured to automatically execute one or more steps in the process for brewing the beverage 144 in response to a user command to provide the beverage 144. The user command can be provided through the user interface 136. The user interface 136 can be any suitable device or combination of devices for inputting information from a user to the machine 100, e.g., to the controller 134, and outputting information to the user. In an exemplary implementation, the user interface 136 includes one or more user controls (e.g., buttons, dials, switches, touch panels, or combinations thereof) and one or more visual display screens (e.g., a liquid crystal display (LCD), a touchscreen, etc.). The user interface 136 is configured to provide beverage and brewing information to the user and to receive a beverage selection and other beverage order information from the user, including the user command to provide the beverage 144. The controller 134 is configured to operate components of the beverage machine 100 to produce the beverage 144 according to the beverage order information.

In an exemplary implementation, the user interface 136 is configured to display a beverage menu and allow the user to input a selection of their preferred beverage. When the user inputs a beverage selection, the user interface 136 can be configured to display information about the selected beverage. The displayed information is based on, e.g., a recipe for the selected beverage that is stored in the memory of the controller 134, and includes beverage properties such as, for example, grind size (e.g., a numerical value representing recommended grind size), grind level (e.g., a visual indication of a recommended grind level on a scale from fine to course), espresso type (e.g., single, double, Americano, or quad), beverage size (single, double, extra-large (XL)), brew type (e.g., classic, rich, over ice, cold brew, etc.), beverage volume (e.g., 8 oz, 10 oz, 12 oz, 16 oz, etc.), beverage temperature (e.g., 175° F., 250° F., 210° F., etc.), beverage type (e.g., latte, cappuccino, flat white, cortado, etc.), or combinations thereof. Some types of beverage properties may not be possible to show because they are inapplicable to a particular beverage machine 100, such as not showing espresso type if the beverage machine 100 cannot brew espresso.

The user interface 136 can be configured to allow the user to customize one or more properties of their selected beverage. In an exemplary implementation, the user interface 136 is configured to display one or more default beverage properties as well as one or more alternative options for each displayed property. The user interface 136 is configured to allow the user to provide input to the user interface 136 to switch from a default property to an alternative option.

One example of a beverage property that the user interface 136 can be configured to allow the user to customize is a beverage volume, e.g., by allowing the user to select one of a plurality of predetermined beverage volumes. The user interface 136 is configured to present the beverage volume options to the user as, e.g., a list of numerical beverage volume values or a list of beverage volume descriptions (e.g., "Small," "Medium," "Large," etc.).

Another example of a beverage property that the user interface 136 can be configured to allow the user to customize is a coffee grind size. The user interface 136 is configured to allow the user to select one of a plurality of predetermined grind sizes. The user interface 136 is configured to present the grind size options to the user as, e.g., a list of numerical grind size values or on a scale from "Fine" to "Coarse."

Another example of a beverage property that the user interface 136 can be configured to allow the user to customize is a grind-to-water ratio, e.g., by allowing a user to select one of a plurality of predetermined grind-to-water ratios (e.g., to select one of 1.5:1, 2:1, 2.5:1, 3:1, 3.5:1, and/or other ratios). Instead of or in addition to allowing a user to select a predetermined grind-to-water ratio, the user interface 136 can be configured to allow a user to manually input a user-chosen grind-to-water ratio.

Another example of a beverage property that the user interface 136 can be configured to allow the user to customize is a brew temperature, e.g., by allowing a user to select one of a plurality of predetermined brew temperatures. Instead of or in addition to allowing a user to select a predetermined brew temperature, the user interface can be configured to allow a user to manually input a user-chosen brew temperature.

The user interface 136 can be configured to receive user inputs for starting, pausing, or cancelling the brewing process. For example, the user interface 136 can include a "Start" button that, when pressed by the user, causes the controller 134 to initiate the brewing process, a "Cancel" button that, when pressed by the user, causes the controller 134 to abort the brewing process, and a "Pause" button that, when pressed by the user, causes the controller 134 to pause the brewing process.

The hopper 102 is configured to contain coffee beans 138. The hopper 102 may be refillable to allow the user to refill the hopper 102 with additional coffee beans 138 or with a new type of coffee beans. The hopper 102 can be removably coupled to the beverage machine 100, e.g., to allow for cleaning of the hopper 102 or for easier refilling of the hopper 102.

In some implementations, the hopper 102 is a single hopper 102 usable with the machine 100. In other implementations, the hopper 102 is a plurality of hoppers configured to be swappable and each configured to removably couple to the beverage machine 100 at a user's selection. Providing a single hopper may reduce cost of the beverage machine 100 and/or may be easier for a user to manage than multiple hoppers. Providing multiple hoppers may allow each of the hoppers to contain a different type of coffee beans to allow the user to more easily and quickly use the machine 100 with different types of coffee beans, e.g., by coupling a selected one of the hoppers to the machine 100 without having to empty any coffee beans of another type already in the hopper 102.

In some embodiments, the memory of the controller 134 can store information about the coffee beans 138 contained in the hopper 102. For example, the controller 134 can store information about a roast type (e.g., light, medium, dark, etc.) of the coffee beans 138 or a density of the coffee beans 138. Information about the coffee beans 138 can be provided to the controller 134 through any suitable means, for example by providing the information to the controller 134 during manufacturing of the coffee machine 100 or by providing the information via user input to the machine 100 (e.g., through the user interface 136).

The weight sensor 104 can be coupled to the hopper 102 and configured to measure a weight of the hopper 102 and any coffee beans 138 contained in the hopper 102. The weight sensor 104 can be or include any suitable device that is configured to measure a weight indicative of only a weight of the hopper 102 and any coffee beans 138 contained in the hopper 102. For example, the weight sensor 104 can be or include a load cell. A total weight of the hopper 102, including any coffee beans 138 contained in the hopper 102, can be configured to be borne solely by the weight sensor 104. The weight measured by the weight sensor 104 can thus accurately reflect a weight of only the hopper 102 and any coffee beans 138 contained in the hopper 102.

In some implementations, the weight sensor 104 is a component of or is included on or in the hopper 102. The hopper 102 can include the weight sensor 104 to facilitate the weight sensor's bearing of the hopper's and coffee beans' weight with the hopper 102 coupled to a housing of the beverage machine 100. The beverage machine 100 can be configured such that, with the hopper 102 coupled to the machine 100, no component of the machine 100 is configured to exert pressure or otherwise add any weight to the hopper 102, so that the weight sensor 104 will measure only the weight of the hopper 102 and any coffee beans 138 contained in the hopper 102. In implementations in which the hopper 102 is configured to removably couple to a housing of the beverage machine 100, the weight sensor 104 is configured to automatically bear the weight of the hopper 102 and any coffee beans 138 contained in the hopper 102 when a user couples to the hopper 102 to the machine 100, so the user need not take any special action to facilitate accurate weight measurement by the weight sensor 104.

The weight sensor 104 can be operatively coupled to the controller 134. The controller 134 can be configured to tare the weight sensor 104 in certain conditions (e.g., at the start of the brewing process) to ensure accuracy of the weight measurements performed by the weight sensor. The weight sensor 104 can be configured to transmit information regarding the measured weight of the hopper 102 and any coffee beans 138 contained in the hopper 102 to the controller 134.

The controller 134 can be configured to use the information provided by the weight sensor 104 regarding the measured weight to control various components of the beverage machine 100. For example, based on the information regarding the measured weight received from the weight sensor 104, the controller 134 can be configured to determine when the weight of the hopper 102 and any coffee beans 138 contained in the hopper 102 meets or falls below a threshold weight value, which can be preprogrammed in the memory of the controller 134. In response to the controller 134 determining that the weight has fallen below the threshold weight value, the user interface 136 is configured to indicate to the user that a supply of the coffee beans 138 contained in hopper 102 is running low to help the user know when to replace the hopper 102 with another, fuller hopper or to refill the hopper 102.

The controller 134 can be configured to control the dispenser 106 based on the information regarding the measured weight of the hopper 102 and any coffee beans 138 contained in the hopper 102 received from the weight sensor 104. The dispenser 106 can be any suitable electro-mechanically controllable device configured to controllably dispense the coffee beans 138 from the hopper 102 to the grinder 108. For example, the dispenser 106 can be an electro-mechanical rotor arranged in an outlet of the hopper 102 or an electro-mechanical sliding door configured to open and close an outlet of hopper 102. The controller 134 can be configured to control operation of the dispenser 106, e.g., control opening and closing of the outlet of the hopper 102, to selectively initiate and halt the dispensing of the coffee beans 138 from the hopper 102. As discussed further below, by controlling the dispenser 106 using the information regarding the measured weight received from the weight sensor 104, the controller 134 can allow an appropriate amount of the coffee beans 138 to be provided to the grinder 108 for the particular beverage selected by the user and thus may allow for all of the coffee beans 138 to be ground by the grinder 108 and the grounds provided to the brew mechanism 110 without any excess beans 138 remaining in the grinder 108.

Based upon the beverage order information received by the controller 134 (and, in some implementations, information about the coffee beans 138 stored in the memory of the controller 134), the controller 134 can be configured to determine an amount of the coffee beans 138 required to brew the beverage 144 ordered by the user. Once the required amount of coffee beans 138 is determined, the controller 134 can be configured to operate the dispenser 106 to initiate the dispensing of the coffee beans 134. As the coffee beans 138*a* are being dispensed from the hopper 102 by the dispenser 106, the controller 134 can be configured to use the measured weight information provided by the weight sensor 104 to monitor a change in the weight of the hopper 102, including any coffee beans 138 contained in the hopper 102. The controller 134 can be configured to halt the dispensing of the coffee beans 138, e.g., to close or turn off the dispenser 106, to stop the coffee beans 138 from being provided from the hopper 102 in response to determining that the weight of the hopper 102, including any coffee beans 138*a* contained in the hopper 102, has changed by an amount corresponding to the required amount of coffee beans 138 for the selected beverage 144. In other words, once the weight of the hopper 102, including any coffee beans 138 contained in the hopper 102, has decreased by an amount corresponding to the required amount of coffee beans for the selected beverage, the controller 134 is configured to prevent any additional coffee beans 138 from being dispensed from the hopper 102. The required amount of coffee beans for the selected beverage can be a value preprogrammed in the memory of the controller 134, with each possible selected beverage being associated in the memory with a required amount of coffee beans. The value may be a discrete value or may be a value range.

The grinder 108 can be arranged downstream of the dispenser 106 and can include any suitable grinding mechanism, for example a pair of burrs separated by a gap that allows coffee beans to be ground between the burrs. The coffee beans 138 released from the hopper 102 by the dispenser 106 can be collected by the grinder 108 for grinding. The grinder 108 can include a motor for driving the grinding mechanism. The motor can be operatively coupled to the controller 134.

The grinder 108 can have a plurality of grind size settings. The grinder 108 can be coupled to or can include a mechanical adjustment mechanism (e.g., one or more gears, etc.) configured to change the grind setting of the grinder 108, e.g., by widening or narrowing a gap between a pair of burrs of the grinder 108. The adjustment mechanism can be configured to be adjusted manually (e.g., by a manually operated lever, dial, wheel, or the like) or by an electro-mechanical device (e.g., by a motor or the like). In embodiments in which the adjustment mechanism is adjusted by an electromechanical device, the controller 134 can be configured to control the electromechanical device to automatically change the grind size setting based upon, e.g., beverage order information provided by the user through the user interface 136.

Figure 2:
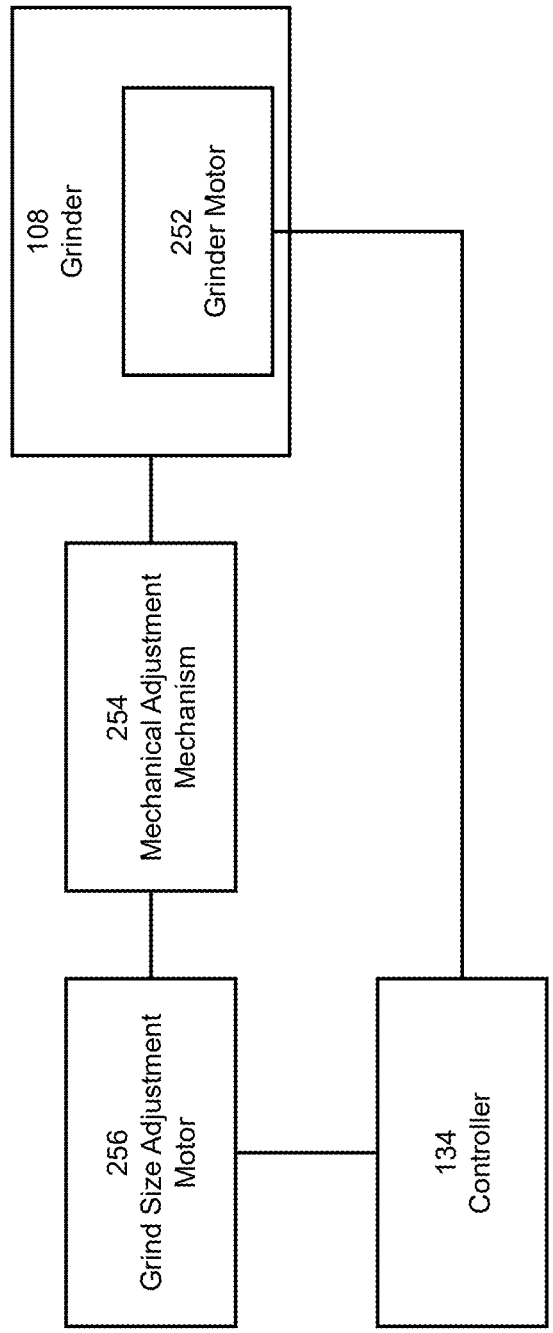
FIG. 2 is a block diagram of one implementation of an automatic grinder control and adjustment system.

One exemplary implementation of an automated control and adjustment system 250 for the grinder 108 in the beverage machine 100 is provided in FIG. 2. As shown, the automated control and adjustment system 250 can include the controller 134, a grinder motor 252, a mechanical grind size setting adjustment mechanism (also referred to herein as a "mechanical adjustment mechanism") 254, and a grind size adjustment motor 256.

As shown in FIG. 2, the grinder 108 can include the grinder motor 252. The grinder motor 252 can be configured to drive the grinding mechanism of the grinder 108. For example, if the grinding mechanism includes a pair of burrs, the grinder motor 252 can be configured to rotate one of the burrs relative to the other burr to cause beans located between the burrs to be ground. The grinder motor 252 can be operatively coupled to the controller 134 of the beverage machine 100. The controller 134 can be configured to control a flow of electrical current to the grinder motor 252 to selectively turn the grinder motor 252 on and off in order to selectively start and stop the grinder 108 and/or to selectively increase or decrease the speed of the grinder motor 252.

The mechanical grind size setting adjustment mechanism 254 can be any suitable mechanical element or combination of mechanical elements configured to adjust the grinding mechanism to change the size of the grinds produced by the grinding mechanism. For instance, if the grinding mechanism comprises a pair of burrs, the mechanical grind size setting adjustment mechanism 254 can include one or more gears that are mechanically coupled to the burrs such that, when rotated, the one or more gears adjust the relative positions of the burrs to narrow or widen a gap between the burrs. A wider gap between the burrs can produce courser coffee grounds.

The grind size adjustment motor 256 can be configured to drive the mechanical grind size setting adjustment mechanism 254. The grind size adjustment motor 256 can be operatively coupled to the controller 134 of the beverage machine 100. The controller 134 can be configured to control a flow of electrical current to the grind size adjustment motor 256 to selectively turn the grind size adjustment motor 256 on and off in order to change a grind size setting of the grinder 108.

Referring again to FIG. 1, the grind size setting of the grinder 108 can be set (manually or automatically) before dispensing of the coffee beans 138 from the hopper 102 by the dispenser 106 is initiated. After the grind size setting of the grinder 108 has been set, the controller 134 can be configured to operate the dispenser 106 to begin the dispensing of the beans 138 from the hopper 102. The controller 134 can be configured to turn on the grinder 108 (e.g., by operating a motor such as the grinder motor 252 described previously with respect to FIG. 2) after dispensing of the beans 138 has started such that the beans 138 that are dispensed from the hopper 102 by the dispenser 106 are received by the grinder 108 and ground to form ground coffee 142. When the controller 134 determines, based upon the information regarding the weight of the hopper 102 and any beans 138 contained in the hopper 102 received from the weight sensor 104, that dispensing should be halted, the controller 134 can be configured to operate the dispenser 106 to stop the dispensing of the beans 138 from the hopper 102. The controller 134 can be configured to allow the grinder 108 to continue running for a predetermined duration (e.g., at least 1 second, at least 2 seconds, at least 3 seconds, at least 4 seconds, or at least 5 seconds) after dispensing has ceased to allow sufficient time for any beans 138 remaining in the grinder 108 to be ground and thereby ensure that there are substantially no beans or grounds retained in the grinder 108, e.g., between grinding elements, such as burrs, of the grinder 108, and that substantially all of the beans 138 or grounds 142 (e.g., all but an amount of beans 138 or grounds 142 less than or equal to 0.5 grams) have passed out of the grinder 108. Once this predetermined duration has passed, the controller 134 can be configured to turn off the grinder 108 (e.g., by operating a motor such as the grinder motor 252 described previously with respect to FIG. 2).

In some implementations, as the grinder 108 grinds the beans 138 disposed therein, the beans 138 can exert a frictional force on the grinding mechanism that can cause grinding to slow. Accordingly, in some implementations, the grinder 108 can include a sensor configured to detect a grinding speed of the grinder 108. For example, if the grinding mechanism includes a pair of burrs that are configured to rotate relative to one another, the grinder 108 can include a rotational speed sensor or the like (e.g., a Hall Effect sensor, a resistive sensor, a vibration sensor, etc.) configured to measure the rotational speed of the burrs. In this case, the controller 134 can be configured to monitor an output from the rotational speed sensor and can continue to power the grinder 108 until it is determined that the rotational speed of the burrs has increased to a speed corresponding to no frictional load, indicating that there are substantially no beans 138 or grounds 142 present in the grinder 108. By not retaining substantially any grounds 142 or beans 138 in the grinder 108, the beverage machine 100 may advantageously allow the user to easily change coffee bean types (e.g., from a caffeinated bean to a decaffeinated bean or a non-caffeinated bean, from one bean roast to another bean roast, etc.) without mixing different coffee bean types in a subsequent brewing operation simply by removing/replacing the hopper 102 without having to clean out the grinder 108 or run a purging operation.

In some implementations, the controller 134 can be configured to use information regarding the weight of the hopper 102 and any beans 138 contained in the hopper 102 received from the weight sensor 104 to detect and address abnormalities associated with the hopper 102, the hopper 104 and/or the dispenser 106. Example processes for detecting and addressing such abnormalities are discussed in further detail below with respect to FIGS. 4-6.

The water reservoir 114 can be any suitable container configured to store water 140 therein. The water reservoir 114 can be configured to be refilled with the water 140 by a user. In some implementations, the water reservoir 114 is non-removably coupled to the beverage machine 100, which can simplify manufacturing of the beverage machine 100. A user can provide the water 140 to the non-removable water reservoir 114 by, e.g., pouring or otherwise providing the water 140 through an opening in the reservoir 114. In other implementations, the water reservoir 114 is removably coupled to the beverage machine 100, allowing users to detach the water reservoir 114 from the beverage machine 100 and carry water reservoir 114 to a convenient refilling location such as a sink.

The water reservoir 114 can include a water level sensor configured to measure an amount of the water 140 contained in the water reservoir 114. The water level sensor is coupled to the controller 134 and is configured to transmit measured water level information to the controller 134. The controller 134 is configured to, based on the received measured water level information, determine when the water level in the water reservoir 114 has fallen below a threshold water level, which can be preprogrammed in the memory of the controller 134. In response to the controller 134 determining that the water level has fallen below the threshold water level, the controller 134 is configured to cause the user interface 136 to instruct the user to refill the water reservoir 114 with the water 140 (or to replace the water reservoir 114 with another, more full water reservoir 114). Additionally, or alternatively, the water reservoir 114 can include at least a portion made of a transparent material to allow a user to see a water level in the water reservoir 114.

The water pumping system 116 can be fluidically coupled to an outlet of the water reservoir 114 and configured to pump the water 140 from the water reservoir 114, e.g., out of the outlet of the water reservoir 114, to the water heating system 118. The pumping system 116 is operatively coupled to the controller 134 to allow the controller 134 to control the pumping provided by the pumping system 116. The pumping system 116 can include, for example, a flowmeter and a fluid pump (e.g., a vibration pump or other suitable fluid pump). The flowmeter is configured to measure an amount of water 140 flowing therethrough. The controller 134 is configured to determine the amount of water 140 to pumped from the water reservoir 114 based on the beverage order information received from the user via the user interface 136. The controller 134 is configured to control the fluid pump of the pumping system 116 using information received from the flowmeter so that the determined amount of water 140 is provided to the heating system 118. The amount of water 140 to be pumped from the water reservoir 114 for the selected beverage can be a value preprogrammed in the memory of the controller 134, with each possible selected beverage being associated in the memory with an amount of water. The value may be a discrete value or may be a value range.

The water heating system 118 can be configured to heat the water 140 pumped from the water reservoir 114 by the pumping system 116. The water heating system 118 can be operatively coupled to the controller 134 to allow the controller 134 to control the water heating system 118 and thus the heating of the water 140 (including not heating the water 140 in instances where the user has selected a cold beverage in which the water 140 should not be heated). The water heating system 118 can include a heating device, for example a thermo-coil boiler, configured to heat the water 140. The water heating system 118 can also include a temperature sensor (e.g., a thermistor or other type of temperature sensor) configured to measure a temperature of the water 140 being heated by the water heating system's heating device. In some implementations, the temperature sensor is configured to directly measure a temperature of the water 140 by, for example, contacting water 140 flowing through or output by the water heating system's heating device. In some implementations, the temperature sensor is configured to measure a temperature of the water heating system's heating device by, for example, directly contacting a surface of the water heating system's heating device, as a temperature indicative of the water 140 being heated.

The controller 134 can be operatively coupled to the water heating system 118 (e.g., to a temperature sensor of the water heating system 118). The controller 134 can be configured to determine a temperature to which the water 140 should be heated by the water heating system 118 based on the beverage order information received from the user via the user interface 136 and, using information received from the water heating system 118 (e.g., measured temperature information received from the temperature sensor), control the water heating system 118 to heat the water 140 to the required temperature for the particular beverage selected by the user. If the user's selected beverage requires no heating of the water 140, the controller 134 controls the water heating system 118 accordingly to allow the water 140, unheated, to flow through the water heating system 118 to the brew basket 110. The temperature to which the water 140 should be heated for the selected beverage can be a value preprogrammed in the memory of the controller 134, with each possible selected beverage being associated in the memory with a temperature. The value may be a discrete value or may be a value range.

In some implementations, the beverage machine 100 can include at least one flowmeter configured to facilitate fluid flow control in the machine 100. For example, the at least one flowmeter can include a plurality of flowmeters, including a first flowmeter configured to measure forward flow (downstream flow) through the pumping system 116 from the water reservoir 114 and a second flowmeter configured to measure bypass flow through a pressure relief valve (PRV) of the machine 100. The PRV can be located downstream of the water pumping system 116 and upstream of the water heating system 118. The PRV can be configured to automatically open at a predetermined pressure, which can be a value preprogrammed in the memory of the controller 134. By automatically opening at the predetermined pressure, the PRV can make the beverage machine 100 more tolerant to overly fine grounds, thus improving beverage quality. In some implementations, the predetermined pressure can be around 9 Bar. In other implementations, other pressures may be used, such as a pressure lower than 9 Bar. In some implementations, the predetermined pressure is adjustable by a user via the user interface 136.

The ground coffee 142 produced by the grinder 108 and the (heated, if required) water 140 can be received by the brew mechanism 110. The brew mechanism 110 can be any device or element or combination of devices and/or elements configured to produce the beverage 144 using the ground coffee 142 and the water 140. The brew mechanism 110 can include at least one chamber, basket, or other suitable container in which the ground coffee 142 and the water 140 are received and combined. In some implementations, the brew mechanism 110 can include one or more components configured to apply pressure to the ground coffee 142 (e.g., a tamper). The brew mechanism 110 can be fluidically coupled to the outlet 124. Once prepared, the beverage 144 can be transported from the brew mechanism 110 to the outlet 124 and subsequently dispensed through the outlet 124 from the coffee machine 110 into, e.g., a mug or other container belonging to the user.

In some implementations, one or more components of the brew mechanism 110 can be operatively coupled to the controller 134. The controller 134 can be configured to automatically control the brew mechanism 110 to produce the beverage 144, e.g., based on the beverage order information received from the user via the user interface 136. The controller's control of the brew mechanism 110 can be preprogrammed in the memory of the controller 134 for each possible selected beverage to help ensure a quality brew for every selected beverage.

Figure 3:
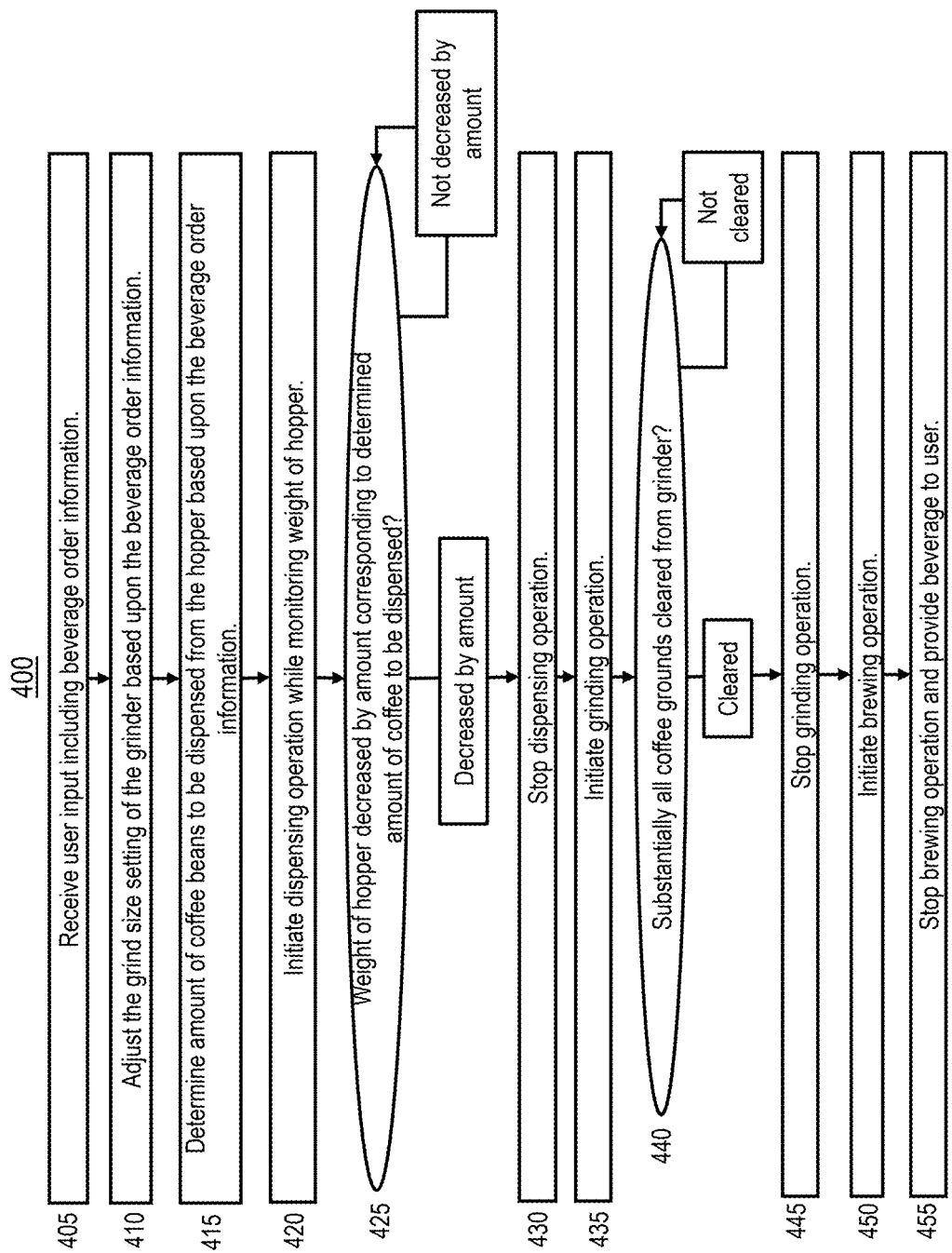
FIG. 3 is a flowchart illustrating one implementation of a method of operating a beverage machine.

FIG. 3 is a flowchart illustrating an exemplary method 400 for operating a beverage machine. The method 400 can be executed by a controller of a beverage machine, such as the beverage machine 100 of FIG. 1 or other beverage machine. In general, the method 400 can allow the beverage machine to accurately measure a weight of a hopper of the beverage machine (e.g., the hopper 102 described above with respect to FIG. 1, etc.) to control the beverage machine's dispenser (e.g., the dispenser 106 described above with respect to FIG. 1, etc.) to dispense a predetermined amount of coffee beans into a grinder (e.g., the grinder 108 described above with respect to FIG. 1, etc.) to be ground such that there are substantially no beans or grounds retained in the grinder, e.g., between grinding elements, such as burrs, of the grinder, and that substantially all of the beans or grounds (e.g., all but an amount of beans or grounds less than or equal to 0.5 grams) have passed out of the grinder.

The method 400 of FIG. 3 is intended only as an example implementation of a method for operating a beverage machine. Those skilled in the art will appreciate that, in some implementations, a method for operating a beverage machine can include one or more steps performed in a different order than the steps of the method 400 of FIG. 3. Additionally, in some implementations, a method for operating a beverage machine can include steps that are not included in the method 400 of FIG. 3, and, in some implementations, a method for operating a beverage machine can omit steps that are included in the method 400 of FIG. 3.

As shown in FIG. 3, at a step 405 of the method 400, the controller of the beverage machine can receive user input including beverage order information. The beverage order information can include, for example, a drink type (e.g., a single espresso shot, a double espresso shot, an Americano, etc.), a beverage volume, a coffee roast level (e.g., light, medium, dark, etc.), and/or the like. The user input can be received by a user interface associated with the beverage machine such as, for example, the user interface 136 of the beverage machine 100 shown in FIG. 1.

Responsive to receiving the user input including the beverage order information at the step 405, the controller of the beverage machine can adjust, at a step 410, a grind size setting of a grinder of the beverage machine, e.g., using an automatic grinder control and adjustment system such as the automated control and adjustment system 250 described above with respect to FIG. 2 or other automatic grinder control and adjustment system. Additionally, responsive receiving the user input comprising the beverage order information at the step 405, the controller of the beverage machine can determine, at a step 415, an amount of coffee beans to be dispensed from the hopper into the grinder for a brewing operation.

After determining the amount of coffee beans to be dispensed at the step 410, the controller of the beverage machine can initiate, at a step 420, a dispensing operation while monitoring a weight of the hopper. The controller can initiate the dispensing operation by powering (that is, turning on) a dispenser such as the dispenser 106 of the beverage machine 100 shown in FIG. 1, etc. The controller can monitor the weight of the hopper using information regarding the weight of the hopper received from a weight sensor that is coupled to the hopper (e.g., the weight sensor 104 of the beverage machine 100 shown in FIG. 1, etc.). In some implementations, the controller can tare the weight sensor prior to initiating the dispensing operation at the step 420.

The controller of the beverage machine can continue the dispensing operation until the controller determines that the weight of the hopper has decreased by an amount corresponding to the determined amount of beans to be dispensed (step 425). Once the weight of the hopper has decreased by an amount that corresponds to the determined amount of coffee, the controller of the beverage machine can, at a step 430, operate the dispenser to halt dispensing of coffee beans from the hopper.

After the dispensing operation has ceased, the controller of the beverage machine can initiate, at a step 435, a grinding operation. The controller can initiate the grinding operation using an automatic grinder control and adjustment system such as the automated control and adjustment system 250 described above with respect to FIG. 2 or other automatic grinder control and adjustment system. The controller can continue the grinding operation until, at a step 440, substantially all of the coffee beans that were dispensed into the grinder have been ground and substantially of the grounds have been cleared from the grinder into a brew mechanism of the beverage machine, such that substantially no beans or grounds are retained within the grinder and substantially all beans and grounds (e.g., all but an amount of beans and grounds less than or equal to 0.5 grams) have passed out of the grinder, leaving the grinder ready for a next brewing operation. In some implementations, the controller of the beverage machine can power the grinder for a predetermined time based on the selected beverage to ensure substantially all of the beans dispensed into the grinder have been ground and that substantially all of the beans and grounds have been cleared from the grinder before stopping the grinding operation at a step 445.

In some implementations, the controller of the beverage machine can monitor a grinding speed of the grinder (e.g., the rotational speed of burrs of the grinder). The controller of the beverage machine can determine that substantially all of the coffee beans that were dispensed into the grinder have been ground and substantially of the grounds have been cleared from the grinder into a brew mechanism of the beverage machine by determining that the grinding speed (e.g., the rotational speed of burrs of the grinder) has increased to a speed corresponding to no frictional load, indicating that there are substantially no beans or grounds present in the grinder. In other implementations, the controller of the beverage machine can determine a length of time that the grinder should run after the dispensing operation has been stopped based on the amount of coffee beans determined at the step 415, and can continue the grinding operation until substantially no beans or grounds are retained within the grinder and substantially all beans and grounds (e.g., all but an amount of beans and grounds less than or equal to 0.5 grams) have passed out of the grinder.

Once substantially all of the beans and grounds have been determined to be fed into the brew mechanism of the beverage machine, at a step 450, the controller of the beverage machine can stop the grinding operation (step 445) and initiate a brewing operation using the brew mechanism (step 450). The brewing operation can include processes such as pumping water (e.g., from a water reservoir such as the water reservoir 114 of the brewing machine 100 shown in FIG. 1, etc.) into the brew mechanism and tamping the ground coffee. Once the controller determines that brewing has been completed, the controller can be configured to stop the brewing operation and to provide the brewed beverage to the user, e.g., by dispensing the beverage from an outlet of the beverage machine (step 455).

Figure 4:
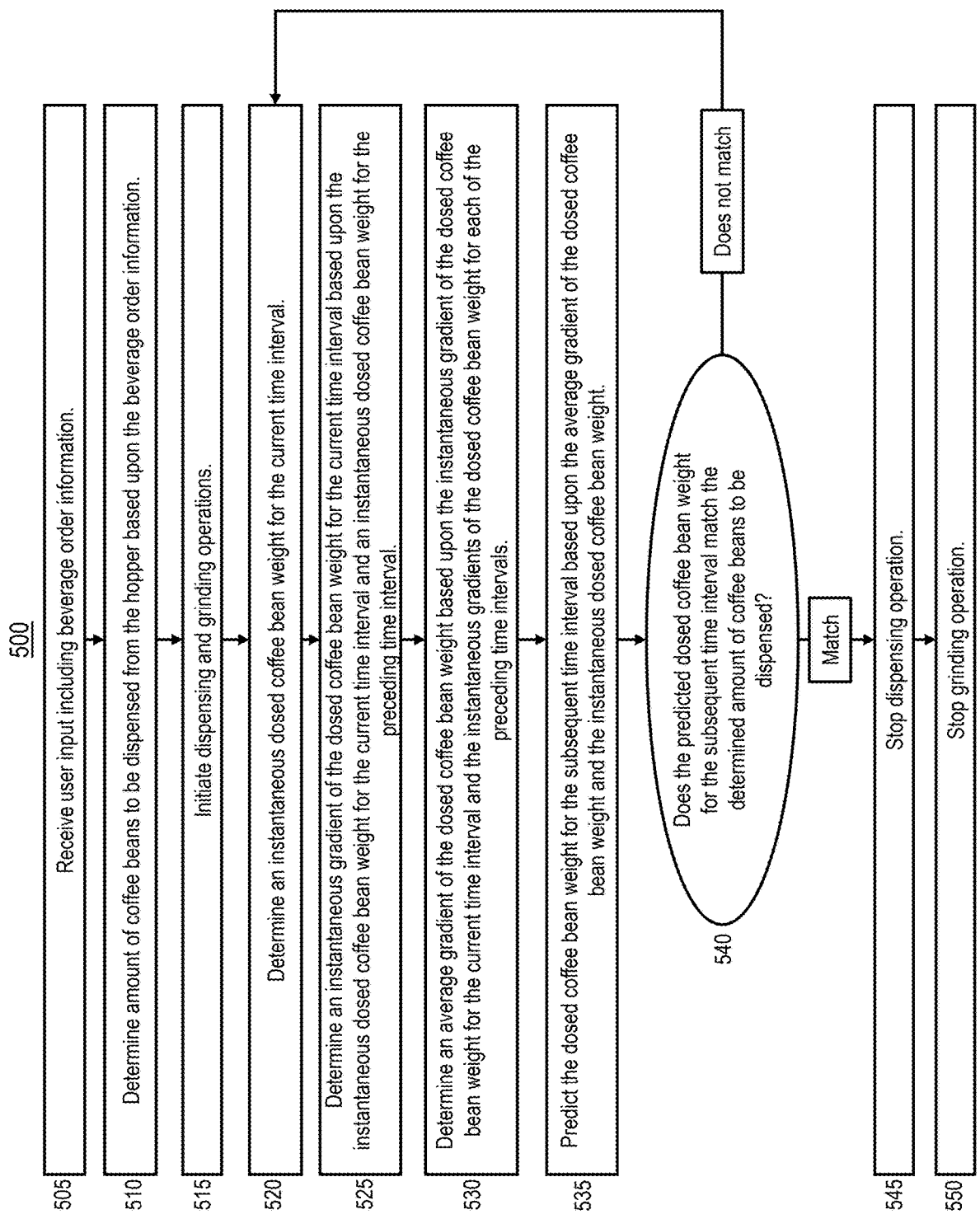
FIG. 4 is a flowchart illustrating one implementation of a method for monitoring a weight of a coffee bean hopper during dispensing and grinding operations.

FIG. 4 is a flowchart illustrating an exemplary method 500 for monitoring a weight of a coffee bean hopper during dispensing and grinding operations. The method 500 of FIG. 4 can be executed by a controller of a beverage machine, such as the beverage machine 100 of FIG. 1 or other beverage machine. In general, the method 500 can allow the beverage machine to accurately measure the weight of the hopper of the beverage machine (e.g., the hopper 102 described above with respect to FIG. 1, etc.) to control the beverage machine's dispenser (e.g., the dispenser 106 described above with respect to FIG. 1, etc.) to dispense a predetermined amount of coffee beans into a grinder (e.g., the grinder 108 described above with respect to FIG. 1, etc.) to be ground such that there are substantially no beans or grounds retained in the grinder, e.g., between grinding elements, such as burrs, of the grinder, and that substantially all of the beans or grounds (e.g., all but an amount of beans or grounds less than or equal to 0.5 grams) have passed out of the grinder.

The method 500 of FIG. 4 is intended only as an example implementation of a method for monitoring a weight of a coffee bean hopper during dispensing and grinding operations. Those skilled in the art will appreciate that, in some implementations, a method for monitoring a weight of a coffee bean hopper during dispensing and grinding operations can include one or more steps performed in a different order than the steps of the method 500 of FIG. 4. Additionally, in some implementations, a method for monitoring a weight of a coffee bean hopper during dispensing and grinding operations can include steps that are not included in the method 500 of FIG. 4, and in some implementations, a method for monitoring a weight of a coffee bean hopper during dispensing and grinding operations can omit steps that are included in the method 500 of FIG. 4.

As shown in FIG. 4, at a step 505, the controller of the beverage machine can receive user input including beverage order information. The beverage order information can include, for example, a drink type (e.g., a single espresso shot, a double espresso shot, an Americano, etc.), a beverage volume, a coffee roast level (e.g., light, medium, dark, etc.), and/or the like. The user input can be received by a user interface associated with the beverage machine such as, for example, the user interface 136 of the beverage machine 100 shown in FIG. 1.

Responsive to receiving the user input including the beverage order information at the step 505, the controller of the beverage machine can determine, at a step 510, an amount of coffee beans to be dispensed from the hopper into the grinder for a brewing operation.

After determining the amount of coffee beans to be dispensed from the hopper, the controller of the beverage machine can initiate, at a step 515, dispensing and grinding operations. The controller can initiate the dispensing operation by powering (that is, turning on) the dispenser of the beverage machine and can initiate the grinding operation by powering (that is, turning on) the grinder of the beverage machine. The dispensing and grinding operations can be initiated simultaneously or sequentially. For example, the controller of the beverage machine can initiate the dispensing operation and, subsequently (e.g., at least 1 second or other predefined amount of time), initiate the grinding operation.

The controller of the beverage machine can continue the dispensing and grinding operations for a predetermined amount of time following the initiation at the step 515. This predetermined amount of time, or "time interval," can correspond to a frequency at which the controller is configured to receive information regarding the weight of the hopper (e.g., from a weight sensor such as the weight sensor 104 of the beverage machine 100 shown in FIG. 1, etc.). In various implementations, the controller can be configured to receive information regarding the weight of the hopper every 1 millisecond, every 10 milliseconds, every 0.25 seconds, every 0.5 seconds, every 0.75 seconds, every 1 second, every 2 seconds, every 3 seconds, every 4 seconds, every 5 seconds, every 6 seconds, every 7 seconds, every 8 seconds, every 9 seconds, every 10 seconds, or at another time interval. In other implementations, the controller can be configured to receive information regarding the weight of the hopper more than four times per second or less than one time every ten seconds.

For each time interval that passes while performing the dispensing and grinding operations, the controller can receive information regarding the weight of the hopper and can determine, at a step 520, based upon the received weight information, an instantaneous dosed coffee bean weight for the current time interval. The instantaneous dosed coffee bean weight for the current time interval can be a total weight of coffee beans that have been dispensed from the hopper in the current beverage preparation process as of the current time interval. In some implementations, the controller can determine the instantaneous dosed coffee bean weight for the current time interval by determining a difference between a weight of the hopper at the current time interval and a weight of the hopper prior to the initiation of the dispensing operation at the step 515. In some implementations, the controller can tare the weight sensor from which the information regarding the weight of the hopper is received prior to initiating the dispensing operation at the step 515, so the weight of the hopper prior to the initiation of the dispensing operation can be set to zero.

The controller can then determine, at a step 525, based upon the instantaneous dosed coffee bean weight for the current time interval and an instantaneous dosed weight for a time interval immediately preceding the current time interval, an instantaneous gradient of the dosed coffee bean weight for the current time interval. The instantaneous gradient of the dosed coffee bean weight for the current time interval can indicate a rate of change, between the current time interval and the preceding time interval, of the total weight of coffee beans that have been dispensed from the hopper.

Following determination of the instantaneous gradient of the dosed coffee bean weight for the current time interval at the step 525, the controller can determine, at a step 530, based upon the instantaneous gradient of the dosed coffee bean weight for the current time interval and the instantaneous gradients of the dosed coffee bean weight for each of the time intervals that precede the current time interval in the current beverage preparation process and follow initiation of the dispensing and grinding operations in the current beverage preparation process, an average gradient of the dosed coffee bean weight. The average gradient of the dosed coffee bean weight can indicate an average rate of change of the total weight of coffee beans that have been dispensed from the hopper across all time intervals in the current beverage preparation process, from the initiation of the dispensing and grinding operations (step 515) up to the current time interval.

Based upon the average gradient of the dosed coffee bean weight determined at the step 530 and the instantaneous dosed coffee bean weight for the current time interval determined at the step 520, the controller can predict, at a step 535, the dosed coffee bean weight for the subsequent time interval (that is, the time interval immediately following the current time interval). In some embodiments, the controller can predict the dosed coffee bean weight for the subsequent time interval by computing a sum of the instantaneous dosed coffee bean weight for the current time interval and the average gradient of the dosed coffee bean weight determined at the step 530. The controller can then determine, at a step 540, whether the predicted dosed coffee bean weight for the upcoming time interval matches the amount of coffee to be dispensed that was determined based upon the beverage order information at the step 510.

If, at the step 540, the predicted dosed coffee bean weight for the upcoming time interval does not match the determined amount of coffee to be dispensed, the controller can return to the step 520. Once the current time interval passes and the subsequent time interval begins, the controller can repeat the steps 520, 525, 530, 535, 540 for the new current time interval.

If, at the step 540, the predicted dosed coffee bean weight for the upcoming time interval does match the determined amount of coffee to be dispensed, the controller can stop, at a step 545, the dispensing operation, e.g., by turning off the dispenser that dispenses coffee beans from the hopper. Subsequently (e.g., after at least 1 second, at least 2 seconds, at least 3 seconds, at least 4 seconds, at least 5 seconds, or other amount of time), at a step 550, the controller can stop the grinding operation, e.g., by turning off the grinder. Stopping the grinding operation after stopping the dispensing operation can ensure that substantially all of the beans or grounds (e.g., all but an amount of beans or grounds less than or equal to 0.5 grams) have passed out of the grinder and that substantially no beans or grounds are retained in the grinder.

Figure 5:
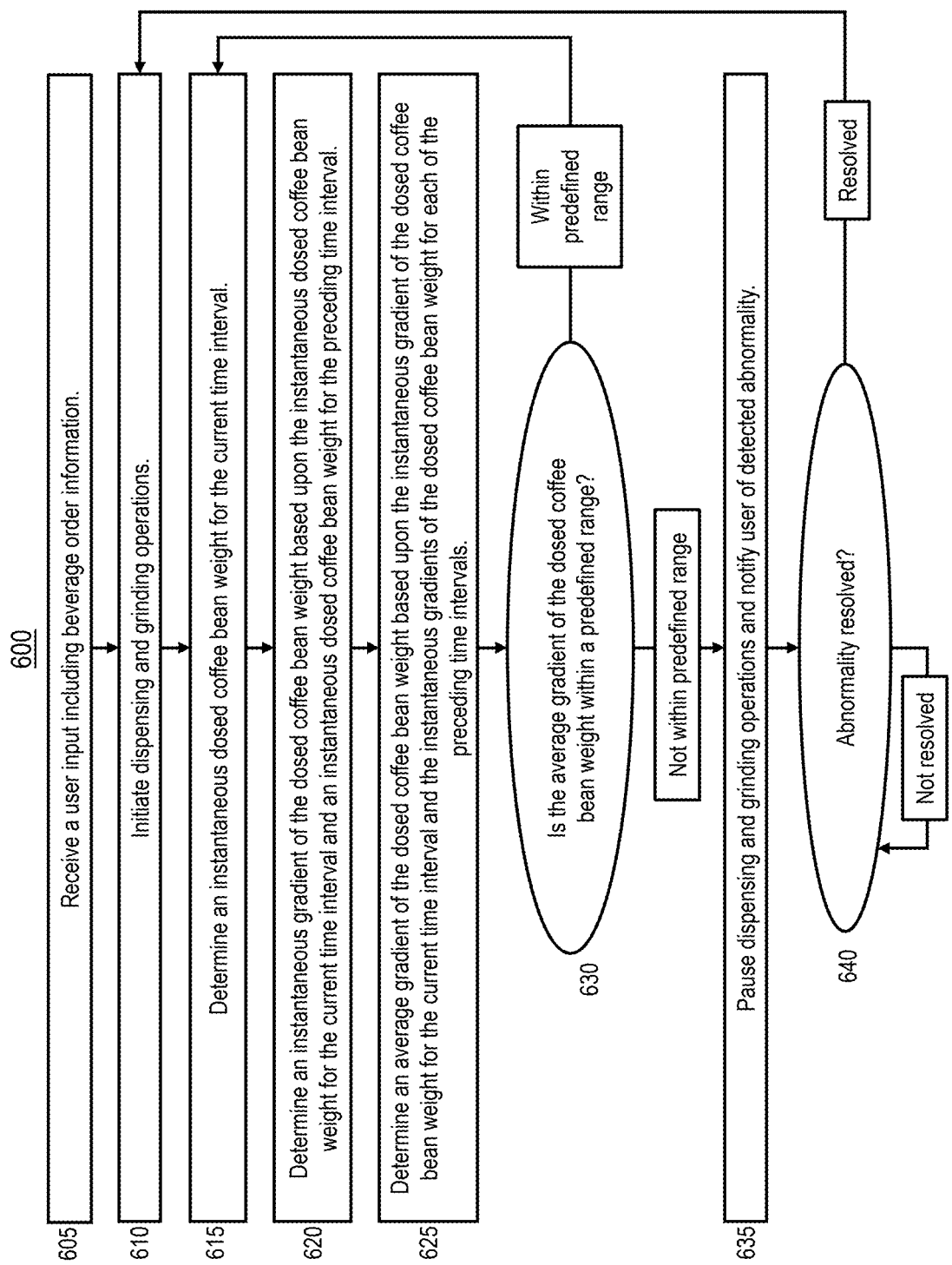
FIG. 5 is a flowchart illustrating one implementation of a method for detecting weight sensor abnormalities or errors during dispensing and grinding operations.

FIG. 5 is a flowchart illustrating an exemplary method 600 for detecting weight sensor abnormalities during dispensing and grinding operations. The method 600 of FIG. 5 can be executed by a controller of a beverage machine, such as the beverage machine 100 of FIG. 1 or another beverage machine. In general, the method 600 of FIG. 5 can allow the beverage machine to accurately measure a weight of a hopper of the beverage machine (e.g., the hopper 102 described above with respect to FIG. 1, etc.) to control the beverage machine's dispenser (e.g., the dispenser 106 described above with respect to FIG. 1, etc.) to dispense a predetermined amount of coffee beans into a grinder (e.g., the grinder 108 described above with respect to FIG. 1, etc.) to be ground such that there are substantially no beans or grounds retained in the grinder, e.g., between grinding elements, such as burrs, of the grinder, and that substantially all of the beans or grounds (e.g., all but an amount of beans or grounds less than or equal to 0.5 grams) have passed out of the grinder.

A weight sensor abnormality can include any deviation of an operating parameter of the weight sensor from a preset value. An example weight sensor abnormality is a deviation of the weight values measured by the weight sensor from a predefined range of weight values, which may indicate a change in the accuracy of the weight data measured by the weight sensor caused, e.g., by unexpected user interaction with the weight sensor during the dispensing or grinding operation. Preset values that define normal weight sensor operation can include numerical values, strings, and/or other data structures and/or data types and can be stored in a memory of the controller of the beverage machine.

The method 600 of FIG. 5 is intended only as an example implementation of a method for detecting weight sensor abnormalities during dispensing and grinding operations. Weight sensor abnormalities can be caused, e.g., by unexpected contact between a user and the coffee bean hopper during a dispensing or a grinding operation or by an unexpected addition of new coffee beans to the coffee bean hopper during a dispensing or a grinding operation. Those skilled in the art will appreciate that, in some implementations, a method for detecting weight sensor abnormalities during dispensing and grinding operations can include one or more steps performed in a different order than the steps of the method 600 of FIG. 5. Additionally, in some implementations, a method for detecting weight sensor abnormalities or errors during dispensing and grinding operations can include steps that are not included in the method 600 of FIG. 5, and in some implementations, a method for detecting weight sensor abnormalities or errors during dispensing and grinding operations can omit steps that are included in the method 600 of FIG. 5.

As shown in FIG. 5, at a step 605, the controller of the beverage machine can receive user input including beverage order information. The beverage order information can include, for example, a drink type (e.g., a single espresso shot, a double espresso shot, an Americano, etc.), a beverage volume, a coffee roast level (e.g., light, medium, dark, etc.), or the like. The user input can be received by a user interface associated with the beverage machine such as, for example, the user interface 136 of the beverage machine 100 shown in FIG. 1.

Responsive to receiving the user input including the beverage order information at the step 605, the controller of the beverage machine can initiate, at a step 610, dispensing and grinding operations. The controller can initiate the dispensing operation by powering (that is, turning on) the dispenser of the beverage machine and can initiate the grinding operation by powering (that is, turning on) the grinder of the beverage machine. The dispensing and grinding operations can be initiated simultaneously or sequentially. For example, the controller of the beverage machine can initiate the dispensing operation and, subsequently (e.g., at least 1 second or other predefined amount of time), initiate the grinding operation.

The controller of the beverage machine can continue the dispensing and grinding operations for a predetermined amount of time following the initiation at the step 610. This predetermined amount of time, or "time interval," can correspond to a frequency at which the controller is configured to receive information regarding the weight of the hopper (e.g., from a weight sensor such as the weight sensor 104 of the beverage machine 100 shown in FIG. 1, etc.). In various implementations, the controller can be configured to receive information regarding the weight of the hopper every 0.25 seconds, every 0.5 seconds, every 0.75 seconds, every 1 second, every 2 seconds, every 3 seconds, every 4 seconds, every 5 seconds, every 6 seconds, every 7 seconds, every 8 seconds, every 9 seconds, every 10 seconds, or at another time interval. In other implementations, the controller can be configured to receive information regarding the weight of the hopper more than four times per second or less than one time every ten seconds.

For each time interval that passes while performing the dispensing and grinding operations, the controller can receive information regarding the weight of the hopper and can determine, at a step 615, based upon the received weight information, an instantaneous dosed coffee bean weight for the current time interval. The instantaneous dosed coffee bean weight for the current time interval can be a total weight of coffee beans that have been dispensed from the hopper in the current beverage preparation process as of the current time interval. In some implementations, the controller can determine the instantaneous dosed coffee bean weight for the current time interval by determining a difference between a weight of the hopper at the current time interval and a weight of the hopper prior to the initiation of the dispensing operation at the step 610. In some implementations, the controller can tare the weight sensor from which the information regarding the weight of the hopper is received prior to initiating the dispensing operation at the step 610, so the weight of the hopper prior to the initiation of the dispensing operation can be set to zero.

The controller can then determine, at a step 620, based upon the instantaneous dosed coffee bean weight for the current time interval and an instantaneous dosed weight for a time interval immediately preceding the current time interval, an instantaneous gradient of the dosed coffee bean weight for the current time interval. The instantaneous gradient of the dosed coffee bean weight for the current time interval can indicate a rate of change, between the current time interval and the preceding time interval, of the total weight of coffee beans that have been dispensed from the hopper in the current beverage preparation process.

Following the determination of the instantaneous gradient of the dosed coffee bean weight for the current time interval at the step 620, the controller can determine, at a step 625, based upon the instantaneous gradient of the dosed coffee bean weight for the current time interval and the instantaneous gradients of the dosed coffee bean weight for each of the time intervals in the current beverage preparation process that precede the current time interval and follow initiation of the dispensing and grinding operations, an average gradient of the dosed coffee bean weight. The average gradient of the dosed coffee bean weight can indicate an average rate of change of the total weight of coffee beans that have been dispensed from the hopper across all time intervals in the current beverage preparation process, from the initiation of the dispensing and grinding operations (step 610) up to the current time interval.

Following the determination of the average gradient of the dosed coffee bean weight at the step 625, the controller can determine, at a step 630, whether the average gradient of the dosed coffee bean weight falls within a predefined range, that is, whether the average gradient of the dosed coffee bean weight exceeds a predefined upper limit (e.g., 5 grams/second or another amount) or falls below a predefined lower limit (e.g., −3.5 grams/second or another amount). The predefined range can be associated with normal (e.g., abnormality-free) functioning of the weight sensor that measures the weight of the hopper of the beverage machine. The average gradient of the dosed coffee bean weight falling within the predefined range can indicate that the information regarding the weight received from the weight sensor is accurate and precise and that there are no significant abnormalities affecting the weight sensor. On the other hand, the average gradient of the dosed coffee bean weight falling outside of the predefined range can indicate the existence of an abnormality that is impacting the ability of the weight sensor to accurately and precisely measure the weight of the hopper. Such abnormalities can result from, e.g., unexpected user interaction with the beverage machine during the dispensing operation.

If the average gradient of the dosed coffee bean weight does fall within the predefined range, the controller of the beverage machine can return to the step 615. Once the current time interval passes and the immediately subsequent time interval begins, the controller can repeat the steps 615, 620, 625, 630 for the new current time interval.

If the average gradient of the dosed coffee bean weight does not fall within the predefined range, that is, if the average gradient of the dosed coffee bean weight exceeds the predefined upper limit or falls below the predefined lower limit, the controller of the beverage machine can, at a step 635, pause the dispensing and grinding operations and notify the user (e.g., using the user interface of the beverage machine) that a weight sensor abnormality has been detected. The dispensing and grinding operations can remain paused until, at a step 640, the abnormality is resolved, that is, until all of the operating parameters associated with the weight sensor no longer deviate from the preset value(s) associated with the weight sensor (e.g., by the user ceasing any unexpected interaction with the beverage machine), the controller can return to the step 610 and re-initiate the dispensing and grinding operations.

In some implementations, if the controller determines, at the step 630, that the average gradient of the dosed coffee bean weight does not fall within the predefined range, the controller can also determine a total amount of time that the average gradient of the dosed coffee bean weight has been outside of the predefined range. If the amount of time that the average gradient of the dosed coffee bean weight has been outside of the predefined range is less than a threshold amount of time (e.g., less than 0.5 seconds), which can be preprogrammed in the controller's memory, then the controller can return to the step 615 and can repeat the steps 615, 620, 625, 630. If the amount of time that the average gradient of the dosed coffee bean weight has been outside of the predefined range is greater than or equal to the threshold amount of time (e.g., greater than or equal to 0.5 seconds), then the controller can proceed to the step 635.

Figure 6:
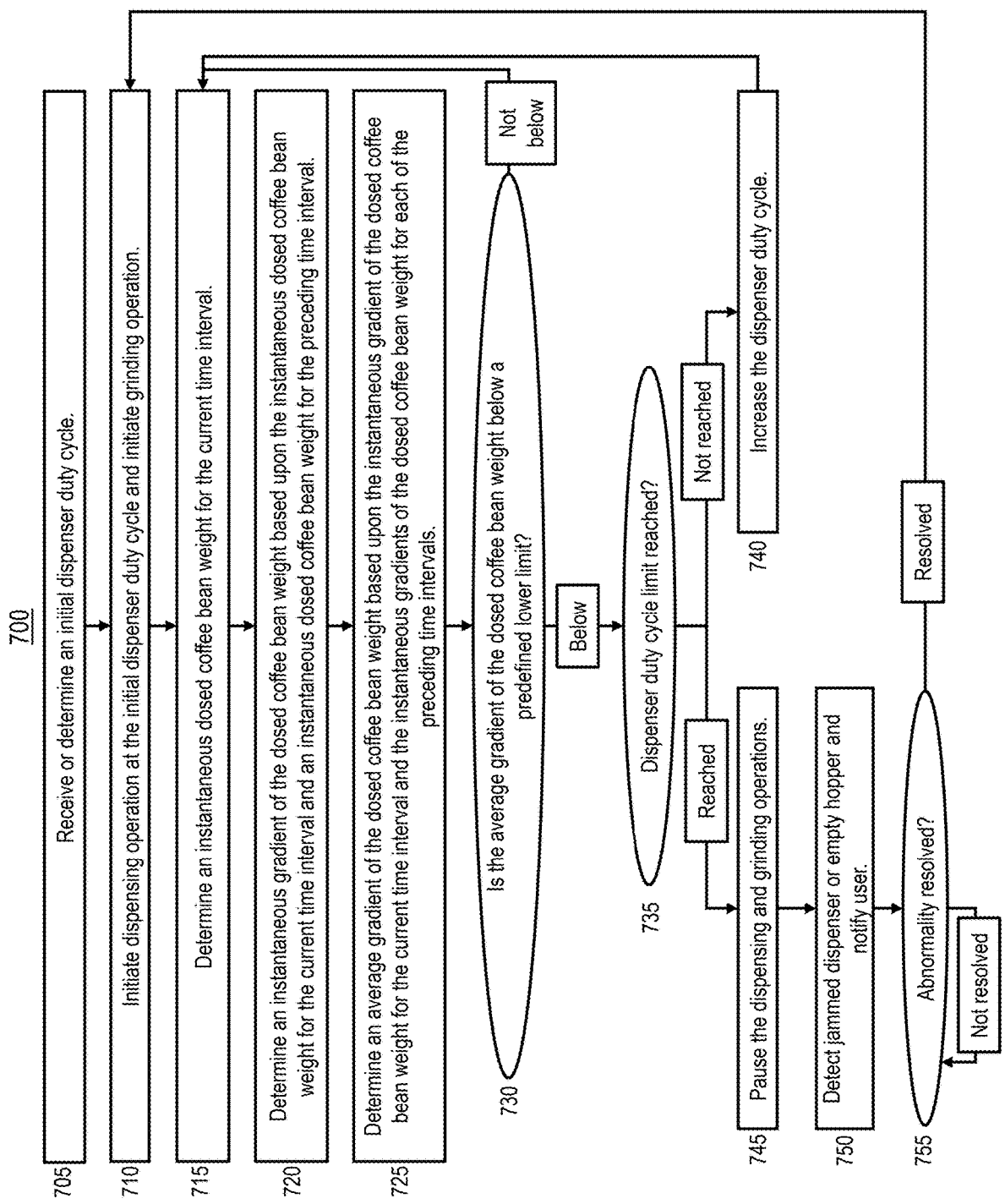
FIG. 6 is a flowchart illustrating one implementation of a method for detecting hopper or dispenser abnormalities or errors during dispensing and grinding operations.

FIG. 6 is a flowchart illustrating an exemplary method 700 for detecting hopper or dispenser abnormalities during dispensing and grinding operations. The method 700 of FIG. 7 can be executed by a controller of a beverage machine, such as the beverage machine 100 of FIG. 1 or another beverage machine. In general, the method 700 of FIG. 6 can allow the beverage machine to accurately measure a weight of a hopper of the beverage machine (e.g., the hopper 102 described above with respect to FIG. 1, etc.) to control the beverage machine's dispenser (e.g., the dispenser 106 described above with respect to FIG. 1, etc.) to dispense a predetermined amount of coffee beans into a grinder (e.g., the grinder 108 described above with respect to FIG. 1, etc.) to be ground such that there are substantially no beans or grounds retained in the grinder, e.g., between grinding elements, such as burrs, of the grinder, and that substantially all of the beans or grounds (e.g., all but an amount of beans or grounds less than or equal to 0.5 grams) have passed out of the grinder.

A hopper abnormality can include any deviation of an operating parameter of the hopper from a preset value. An example hopper abnormality is a deviation of the amount of coffee beans contained in the hopper a predefined amount of coffee beans, which may indicate e.g., that the hopper is empty or nearly empty. Preset operating values that define normal hopper operation can include numerical values, strings, and/or other data structures and/or data types and can be stored in a memory of the controller of the beverage machine.

A dispenser abnormality can include any deviation of an operating parameter of the dispenser from a preset operating value. An example dispenser abnormality is a deviation of the rate at which the dispenser dispenses beans from the hopper from a predefined dispensing rate, which may indicate, e.g., a jam in the dispenser. Preset operating values that define normal dispenser operation can include numerical values, strings, and/or other data structures and/or data types and can be stored in a memory of the controller of the beverage machine.

The method 700 of FIG. 6 is intended only as an example implementation of a method for detecting hopper or dispenser abnormalities during dispensing and grinding operations. Those skilled in the art will appreciate that, in some implementations, a method for detecting hopper or dispenser abnormalities during dispensing and grinding operations can include one or more steps performed in a different order than the steps of the method 700 of FIG. 6. Additionally, in some implementations, a method for detecting hopper or dispenser abnormalities during dispensing and grinding operations can include steps that are not included in the method 700 of FIG. 6, and in some implementations, a method for detecting hopper or dispenser abnormalities during dispensing and grinding operations can omit steps that are included in the method 700 of FIG. 6.

As shown in FIG. 6, at a step 705, the controller of the beverage machine can receive or determine an initial dispenser duty cycle. The initial dispenser duty cycle can be input by the user or can be determined based upon beverage order information input by the user (e.g., via a user interface of the beverage machine such as the user interface 136 of the beverage machine 100 shown in FIG. 1, etc.). In particular, the initial dispenser duty cycle can be based upon a grind size for the beverage. For finer grinds (e.g., small grind sizes), the initial dispenser duty cycle can be lower, e.g., about 35%. For coarser grinds (e.g., larger grind sizes), the initial dispenser duty cycle can be higher, e.g., about 50%. This can mitigate jamming of the grinder by ensuring slower dosing of coffee beans for finer grinds and faster dosing of coffee beans for coarser grinds.

Responsive to receiving or determining the initial dispenser duty cycle at the step 705, the controller of the beverage machine can initiate, at a step 710, a dispensing operation and a grinding operation. The controller can initiate the dispensing operation by powering (that is, turning on) the dispenser of the beverage machine such that the dispenser operates at the initial dispenser duty cycle. The controller can initiate the grinding operation by powering (that is, turning on) the grinder of the beverage machine. The dispensing and grinding operations can be initiated simultaneously or sequentially. For example, the controller of the beverage machine can initiate the dispensing operation and, subsequently (e.g., at least 1 second or other amount of time), initiate the grinding operation.

The controller of the beverage machine can continue the dispensing and grinding operations for a predetermined amount of time following the initiation at the step 710. This predetermined amount of time, or "time interval," can correspond to a frequency at which the controller is configured to receive information regarding the weight of the hopper (e.g., from a weight sensor such as the weight sensor 104 of the beverage machine 100 shown in FIG. 1, etc.). In various implementations, the controller can be configured to receive information regarding the weight of the hopper every 0.25 seconds, every 0.5 seconds, every 0.75 seconds, every 1 second, every 2 seconds, every 3 seconds, every 4 seconds, every 5 seconds, every 6 seconds, every 7 seconds, every 8 seconds, every 9 seconds, every 10 seconds, or other time interval. In other implementations, the controller can be configured to receive information regarding the weight of the hopper more than four times per second or less than one time every ten seconds.

For each time interval that passes while performing the dispensing and grinding operations, the controller can receive information regarding the weight of the hopper and can determine, at a step 715, based upon the received weight information, an instantaneous dosed coffee bean weight for the current time interval. The instantaneous dosed coffee bean weight for the current time interval can be a total weight of coffee beans that have been dispensed from the hopper in the current beverage preparation process as of the current time interval. In some implementations, the controller can determine the instantaneous dosed coffee bean weight for the current time interval by determining a difference between a weight of the hopper at the current time interval and a weight of the hopper prior to the initiation of the dispensing operation at the step 710. In some implementations, the controller can tare the weight sensor from which the information regarding the weight of the hopper is received prior to initiating the dispensing operation at the step 710, so the weight of the hopper prior to the initiation of the dispensing operation can be set to zero.

The controller can then determine, at a step 720, based upon the instantaneous dosed coffee bean weight for the current time interval and an instantaneous dosed weight for a time interval immediately preceding the current time interval, an instantaneous gradient of the dosed coffee bean weight for the current time interval. The instantaneous gradient of the dosed coffee bean weight for the current time interval can indicate a rate of change, between the current time interval and the immediately preceding time interval, of the total weight of coffee beans that have been dispensed from the hopper in the current beverage preparation process.

Following determination of the instantaneous gradient of the dosed coffee bean weight for the current time interval at the step 720, the controller can determine, at a step 725, based upon the instantaneous gradient of the dosed coffee bean weight for the current time interval and the instantaneous gradients of the dosed coffee bean weight for each of the time intervals in the current beverage preparation process that precede the current time interval and follow initiation of the dispensing and grinding operations at the step 710, an average gradient of the dosed coffee bean weight. The average gradient of the dosed coffee bean weight can indicate an average rate of change of the total weight of coffee beans that have been dispensed from the hopper across all time intervals in the current beverage preparation process, from the initiation of the dispensing and grinding operations (step 710) up to the current time interval.

Following determination of the average gradient of the dosed coffee bean weight at the step 725, the controller can determine, at a step 730, whether the average gradient of the dosed coffee bean weight has fallen below a predefined limit (e.g., 0.25 grams/second or another amount) and/or whether the average gradient of the dosed coffee bean weight is near (e.g., within 5% of) or within a predefined range (e.g., between 0.25 grams/second and −0.25 grams per second), which can be preprogrammed in a memory of the controller. The predefined limit or range can correspond to a near-zero dosed coffee bean weight gradient. The average gradient of the dosed coffee bean weight falling below the predefined limit or near or within the predefined range can indicate that the dosed coffee bean weight has not, on average, been changing significantly. Lack of significant changes in the dosed coffee bean weight can result if the dispenser is jammed or if there is a low volume of beans in the hopper.

If the average gradient of the dosed coffee bean weight is above the predefined limit or outside of the predefined range, the controller of the beverage machine can return to the step 715. Once the current time interval passes and the immediately subsequent time interval begins, the controller can repeat the steps 715, 720, 725, 730 for the new current time interval.

If the average gradient of the dosed coffee bean weight is below the predefined limit or near/within the predefined range, the controller of the beverage machine can determine, at a step 735, whether a dispenser duty cycle limit has been reached. The controller can be configured to maintain the dispenser duty cycle between a predefined lower duty cycle limit (e.g., 30%) and a predefined upper duty cycle limit (e.g., 70%) to ensure accurate, stable, and efficient coffee bean dosing.

If the dispenser duty cycle is below the predefined upper limit, the controller can increase, at a step 740, the dispenser duty cycle by a predefined increment (e.g., 5% or other increment), which can be preprogrammed in a memory of the controller. For minor dispenser jams, increasing the dispenser duty cycle can, in some situations, dislodge coffee beans that are causing the jam. After increasing the dispenser duty cycle, the controller of the beverage machine can return to the step 715. Once the current time interval passes and the subsequent time interval begins, the controller can repeat the steps 715, 720, 725, 730 for the new current time interval.

If the dispenser duty cycle is above the predefined upper limit, the controller can pause, at a step 745, the dispensing and grinding operations. At a step 750, the controller can determine the cause of the low average gradient of the dosed coffee bean weight by detecting that the dispenser is jammed or that the hopper is empty. The controller can, at the step 750, notify the user (e.g., using the user interface of the beverage machine) that a dispenser jam has been detected or that the hopper needs to be refilled with coffee beans or replaced with a new, full hopper. The dispensing and grinding operations can remain paused until, at a step 755, the abnormality is resolved, that is, that all of the operating parameters of the hopper and the dispenser no longer deviate from the preset value(s) (e.g., by the user manually resolving a jam in the dispenser, or by the user refilling or replacing the hopper), and the controller can then return to the step 710 and re-initiate the dispensing and grinding operations.

Figure 7:
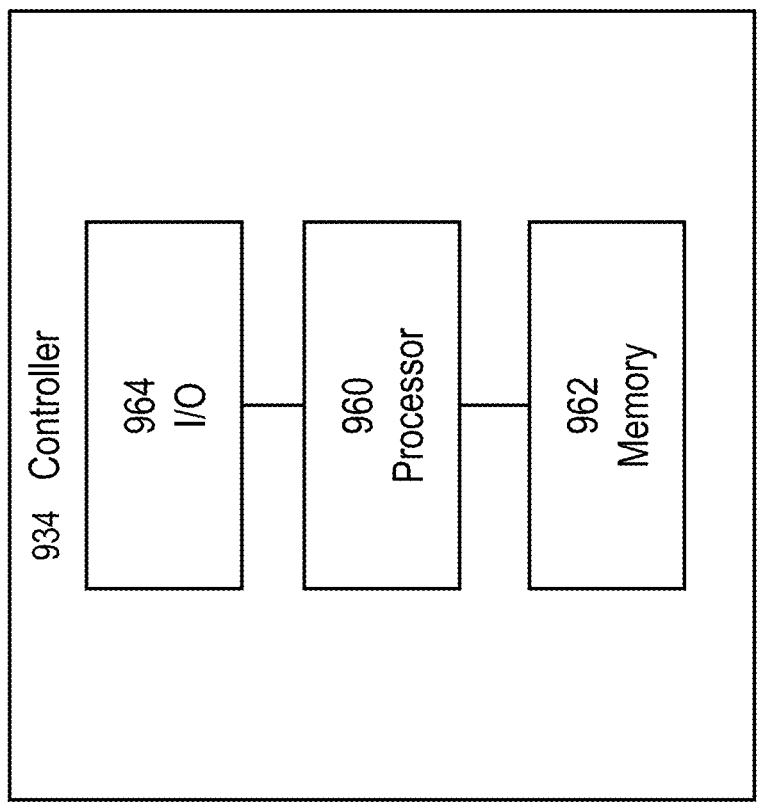
FIG. 7 is a block diagram of one implementation of a controller of a beverage machine.

As discussed above, the methods described herein, e.g., method 400 shown in FIG. 3, the method 500 shown in FIG. 4, the method 600 shown in FIG. 5, method 700 shown in FIG. 6, etc., can be executed by a controller of a beverage machine. An example controller 934 is illustrated in FIG. 7. The controller 934 can include at least one data processor (also referred to herein as a "processor") 960, for example a CPU or a field programmable gate array (FPGA). The controller 934 can also include a memory 962 containing instructions executable by the at least one processor 960 that cause the at least one processor 960 to perform operations such as those of the methods 400, 500, 600, 700 of FIGS. 3-6. The at least one processor 960 is coupled to an input/output (I/O) interface 964 for sending and receiving data between the at least one processor 960 and other components of the beverage machine, e.g., a weight sensor such as the weight sensor 104 of the beverage machine 100, a dispenser such as the dispenser 106 of the beverage machine 100, a grinder such as the grinder 108 of the beverage machine 100, a user interface such as the user interface 136 of the beverage machine 100, etc. In certain instances, the controller 934 can additionally communicate status with and send actuation and/or control signals to systems or devices that are separate from the beverage machine, for example another computer system (e.g., a user's phone and/or other computer system). The beverage machine controllers described herein (e.g., the controller 134 of the beverage machine 100 shown in FIG. 1, etc.) can include one or more features and/or components of the controller 934.

More generally, the subject matter described herein can be implemented in analog electronic circuitry, digital electronic circuitry, and/or in computer software, firmware, or hardware, including the structural means disclosed in this specification and structural equivalents thereof or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, algorithm, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices). The processor and the memory can be supplemented by, or incorporated in, special purpose logic circuitry.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor-readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor). The modules described herein can be combined, integrated, separated, and/or duplicated to support various applications. Also, a function described herein as being performed at a particular module can be performed at one or more other modules and/or by one or more other devices instead of or in addition to the function performed at the particular module.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

The invention claimed is:

1. A method comprising:
    causing coffee beans to be dispensed from a hopper configured to contain the coffee beans and into a grinder configured to grind the coffee beans;
    as the coffee beans are dispensed into the grinder, measuring, by a weight sensor, a total weight of the hopper and the coffee beans and receiving, from the weight sensor, data characterizing a weight of the hopper as the coffee beans are dispensed into the grinder; and
    determining, based on the received data, an amount of coffee beans dispensed into the grinder.

2. The method of claim 1, further comprising determining that the amount of coffee beans dispensed into the grinder corresponds to a predetermined amount of coffee beans associated with an ordered beverage.

3. The method of claim 2, further comprising, in response to determining that the amount of coffee beans dispensed into the grinder corresponds to the predetermined amount of coffee beans:
    causing the coffee beans to stop being dispensed from the hopper.

4. The method of claim 2, further comprising starting the grinder to cause the coffee beans dispensed into the grinder to be ground.

5. The method of claim 4, further comprising, in response to determining that the amount of coffee beans dispensed into the grinder corresponds to the predetermined amount of coffee beans:
    determining that all but a threshold amount of coffee beans and coffee grounds have been cleared from the grinder.

6. The method of claim 5, wherein the threshold amount of coffee beans and coffee grounds is 0.5 grams.

7. The method of claim 5, further comprising, in response to determining that all but the threshold amount of coffee beans and coffee grounds have been cleared from the grinder:
stopping the grinder.

8. The method of claim 1, further comprising, based upon the information regarding the weight of the hopper:
determining an average rate of change of the amount of coffee beans dispensed into the grinder.

9. The method of claim 8, wherein the amount of beans dispensed into the grinder is determined at a first time, the method further comprising:
determining, based upon the amount of coffee beans dispensed into the grinder and the average rate of change of the amount of coffee beans dispensed into the grinder, a predicted amount of coffee beans that will be dispensed into the grinder by a second time after the first time.

10. The method of claim 9, further comprising:
determining that the predicted amount of coffee beans that will be dispensed into the grinder by the second time matches a predetermined amount of coffee beans associated with an ordered beverage; and
stopping the dispensing operation.

11. A method comprising:
causing coffee beans to be dispensed by a dispenser from a hopper configured to contain the coffee beans and into a grinder configured to grind the coffee beans;
as the coffee beans are dispensed into the grinder, measuring, by a weight sensor, a total weight of the hopper and the coffee beans and receiving, from the weight sensor, data characterizing a weight of the hopper; and
detecting, based on the data characterizing the weight of the hopper, a deviation of an operating parameter associated with the hopper, the dispenser, or the weight sensor from a preset value.

12. The method of claim 11, further comprising, in response to detecting the deviation of the operating parameter associated with the hopper, the dispenser, or the weight sensor from the preset value:
causing the coffee beans to stop being dispensed from the hopper and into the grinder.

13. The method of claim 12, further comprising:
determining that the operating parameter associated with the hopper, the dispenser, or the weight sensor has been no longer deviates from the preset value; and
causing the coffee beans to resume being dispensed from the hopper and into the grinder.

14. The method of claim 11, wherein detecting the deviation of the operating parameter associated with the hopper, the dispenser, or the weight sensor from the preset value comprises:
determining, based on the data characterizing the weight of the hopper, an average rate of change of an amount of coffee beans dispensed into the grinder.

15. The method of claim 14, wherein detecting the deviation of the operating parameter associated with the hopper, the dispenser, or the weight sensor from the preset value further comprises:
determining that the average rate of change of the amount of coffee beans dispensed into the grinder is less than a predefined lower limit or greater than a predefined upper limit.

16. The method of claim 15, wherein the predefined upper limit is 5 grams of coffee beans per second.

17. The method of claim 15, wherein the predefined lower limit is −3.5 grams of coffee beans per second.

18. The method of claim 11, wherein the detected deviation is associated with the dispenser, and wherein the method further comprises:
determining that a duty cycle of the dispenser is less than a predefined duty cycle limit.

19. The method of claim 18, herein the predefined duty cycle limit is 70%.

20. The method of claim 18, further comprising:
increasing a duty cycle of the dispenser in response to determining that the duty cycle of the dispenser is less than the predefined duty cycle limit.

* * * * *